7261X
J. Ring,
Chain Propeller,
Patented Oct. 25, 1832.
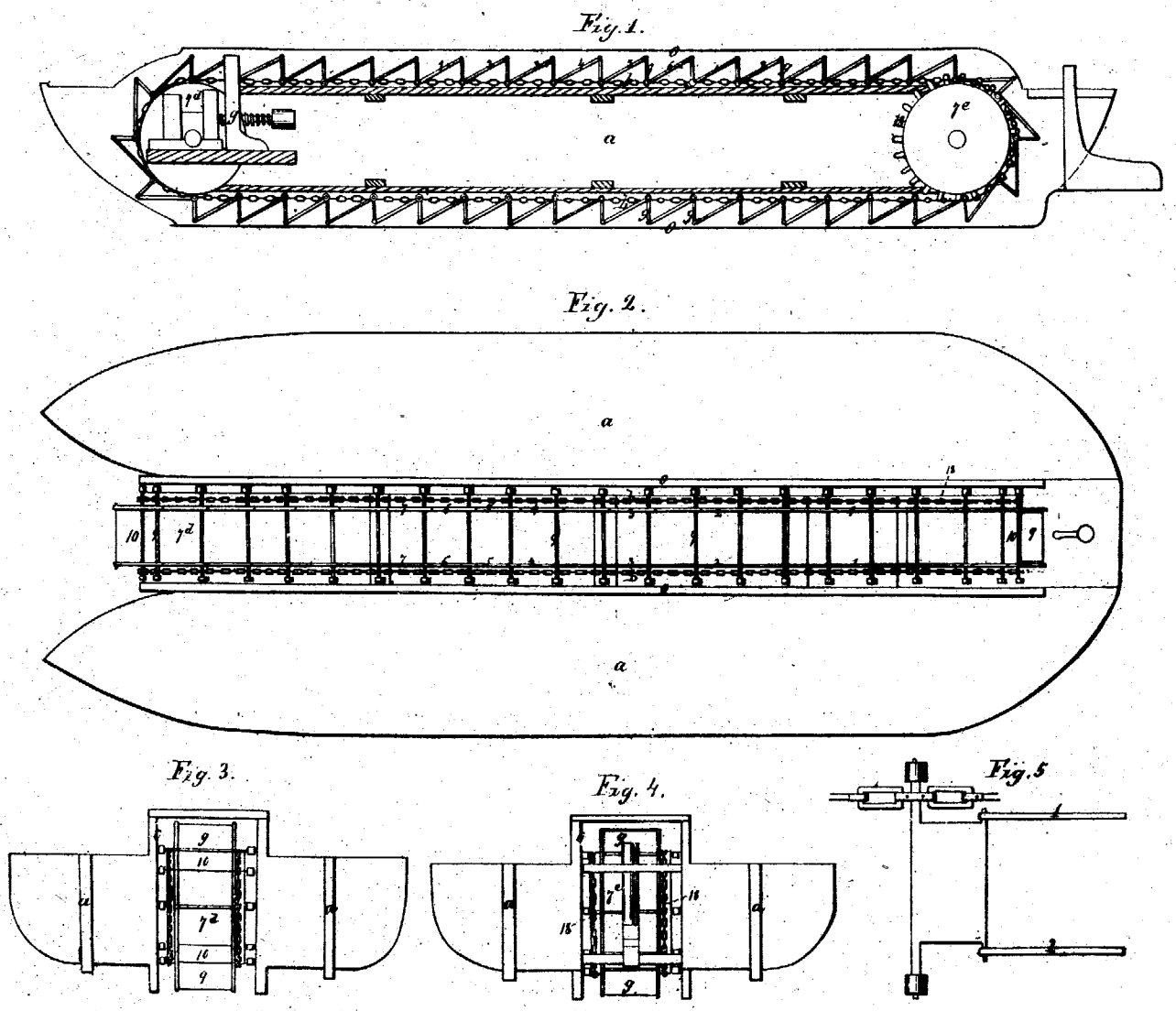

7261X    Oct. 25. 1832    16    381

Jarvis King

Letters Patent.

The schedule referred to in these Letters Patent and making part of the same containing a description in the words of the said Jarvis King himself of his improvement in Machinery for propelling Boats.

The Boat or other Water Craft is constructed with two keels stem and stern posts at a convenient distance apart & of proper depth & planked across on the upper edges to form a channel between the keels, open at the bottom the sides or bearings of said craft to be fastened nigh the bottom of the keels, the machinery to propel the craft is formed with two flat chains, to which buckets are fastened crosswise, one end to one chain, the other end to the other chain & kept in a proper position, by braces at each end, fastened to the chains & buckets 1. 2. 3, 5 —— The buckets are made of wood or sheet iron, the length and width according to the channel they are to run in 9. 10.

The chains are made with square links, connected together, with band iron, being bent in & riveted between each square link and can be made in as many pieces as is convenient to be handled by having hooks on one end of the flat links, and when put together is formed into an oblong wheel by being extended & supported on rolling cylinders 7. placed near the bow and stern of the boat, so situated, that the buckets will act on the water in the channel under the boat 9. 10. and are carried up and over the deck in a trunk constructed for the purpose on each end of the buckets, is fixed a small trunk or roller 0. to run on a groove, or bar of iron fastened to the inside of the channel and trunk to prevent sagging & friction, the cylinders that lie on the water to be tight as a cask, stern cylinder, to which power is applied to put the wheel in motion, has cogs at each end 18 where the chains run at equal distances apart, so as to match with the open links of the chains 5. which are also of equal length, to prevent slipping. The cylinder nigh the bow of the boat to be hung in timbers so as to slide by turning screws to straighten

7261X or slack the chains when required.

By applying steam or other power to the stern cylinder, the wheel is set in motion, the buckets continually passing from bow to stern in the channel, under the boat and up over the deck in said trunk, act on the water with more power, than any machinery now in use, & by throwing the water from the bow to the stern, under the boat, prevents a swell and surf that injures canal banks.

The above described chain wheel by being extended on cylinders and so hung that the under side buckets can run in a trunk, where there is great fall, will go with more power with a small run of water let into the wheel than any other wheel in use, & for current Mills are of great advantage, for they can be extended to any convenient length and width necessary — —

Witnesses
Wm. McKnight
Abner Rathburn

Jarvis King —

640 1.87